United States Patent
da Silva et al.

(10) Patent No.: US 9,408,247 B2
(45) Date of Patent: Aug. 2, 2016

(54) RADIO LINK FAILURE (RLF) REPORTING

(71) Applicant: TELEFONAKTIEBOLAGET L M ERICSSON (PUBL), Stockholm (SE)

(72) Inventors: Icaro L. J. da Silva, Sollentuna (SE); Angelo Centonza, Winchester (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 14/290,382

(22) Filed: May 29, 2014

(65) Prior Publication Data
US 2015/0350932 A1    Dec. 3, 2015

(51) Int. Cl.
*H04L 12/26* (2006.01)
*H04W 76/02* (2009.01)
*H04W 36/00* (2009.01)

(52) U.S. Cl.
CPC ........ *H04W 76/027* (2013.01); *H04W 36/0083* (2013.01)

(58) Field of Classification Search
CPC . H04W 24/02; H04W 36/30; H04W 36/0066; H04W 76/027; H04W 36/0083
USPC ........................................................ 370/225
See application file for complete search history.

(56) References Cited

U.S. PATENT DOCUMENTS

| | | | | |
|---|---|---|---|---|
| 2013/0153298 A1* | 6/2013 | Pietraski | ................ | H04L 5/001 175/45 |
| 2015/0029835 A1* | 1/2015 | Zhang | ................... | H04W 24/04 370/225 |
| 2015/0105066 A1* | 4/2015 | Wu | ....................... | H04W 36/08 455/423 |

OTHER PUBLICATIONS

Huawei. IRAT MRO Way Forward. 3GPP TSG-RAN WG3 Meeting #75. R3-120390. Dresden, Germany. Feb. 6-10, 2012.
Huawei. RLF Report over S1. 3GPP TSG-RAN WG3 Meeting #77bis. R3-122081. Lecce,Italy. Oct. 8-12, 2012.

\* cited by examiner

*Primary Examiner* — Sai-Ming Chan

(57) ABSTRACT

A method and network node for handling Radio Link Failure (RLF) Reports in a radio access network that utilizes different Radio Access Technologies (RATs) in different areas. A User Equipment (UE) generates and stores an RLF Report when the UE experiences an RLF at a first access node (AN) that utilizes a first RAT and the UE reconnects to a second AN that utilizes a second RAT. When the UE later reconnects to a third AN that utilizes the first RAT, the UE sends the RLF Report to the third AN. When the third AN does not have a connection to the first AN, the third AN determines whether receiving the RLF Report has caused a threshold value to be exceeded. If so, the third AN generates an event log containing failure information for the first AN, and makes the event log available to the network for corrective action.

14 Claims, 6 Drawing Sheets

RADIO LINK FAILURE (RLF) REPORTING

TECHNICAL FIELD

The present disclosure relates generally to radio telecommunication systems and more particularly to a method of handling Radio Link Failure (RLF) reports in a radio access network.

BACKGROUND

Radio Access Networks (RANs) in cellular telecommunication systems may include base stations (e.g., NodeBs or eNodeBs) utilizing different Radio Access Technologies (RATs). For example, most of the area covered by a RAN may utilize 3G NodeBs in a Universal Mobile Telecommunication System (UMTS) Terrestrial Radio Access Network (UTRAN), while pockets or islands within the coverage area utilize eNodeBs in a Long Term Evolution (LTE) access network. Such networks can cause problems implementing a Mobile Robustness Optimization (MRO) function when a User Equipment (UE) moves between different RATs.

One of the goals of a consistent MRO function is to make failure reports available in the nodes where the failure originated, assuming these nodes are the ones responsible for performing corrective action. In various scenarios, the UE may experience an RLF while moving between LTE eNodeBs, or when performing an Inter-RAT (IRAT) handover between an LTE eNodeB and a UTRAN NodeB.

FIG. 1 is a sequence diagram illustrating an existing solution for IRAT MRO. As illustrated, a UE operating in eNodeB_1 experiences an RLF and then reconnects for a period of time in 3G Cell_1. Subsequently, the UE is handed over to LTE again and connects to eNodeB_2. In this solution, as adopted by the Third Generation Partnership Project (3GPP) in LTE Release 11, the UE stores link failure information (formatted in a RLF Report as defined in TS36.331) while operating outside of the LTE area (e.g., in 3G Cell_1), and sends the RLF Report with the failure information to the first eNodeB it reconnects to when it returns to LTE (which may not be the eNodeB where the failure occurred). The serving eNodeB receiving the RLF report from the UE (e.g., eNodeB_2) should forward the failure information to the original eNodeB where the failure occurred (e.g., eNodeB_1) via an X2AP RLF Indication message as defined in TS36.423.

FIG. 2 is a sequence diagram illustrating a problem with the existing solution for IRAT MRO of FIG. 1. Forwarding of the failure information to the original eNodeB where the failure occurred is only ensured if the eNodeB receiving the RLF Report has an X2 connection with the original eNodeB where the failure occurred. This is because the RLF Report is forwarded only via the X2AP RLF Indication message as defined in TS36.423. If the X2 connection does not exist, these reports are currently discarded by the eNodeB receiving the RLF report from the UE.

As noted above, initial LTE deployments may consist of coverage "islands" within extended areas of UTRAN coverage. UEs only send RLF Reports to LTE eNodeBs. Thus, when a UE is connected to an eNodeB belonging to an LTE island and suffers an RLF while handing over to a UTRAN NodeB, the UE will only report the failure when the UE subsequently reconnects to an LTE eNodeB. The eNodeB that receives the RLF Report from the UE may be in another LTE island distant from the eNodeB where the failure occurred. Since direct handovers between eNodeB's belonging to these distant islands are unlikely or impossible, there will be no X2 connection between the eNodeB that receives the RLF Report from the UE and the original eNodeB where the failure occurred. Consequently, the eNodeB that receives the RLF Report from the UE will discard the report. Thus, the failure information will never be reported, and the performance of the Inter-RAT MRO solution may be severely affected. This implies that a reliable root cause analysis of the failure cannot be carried out by the failure eNodeB and the failure cannot be corrected.

In the present disclosure, the problem addressed is that of ensuring a robust MRO solution by making failure reports available in the node where the failure originated, especially in scenarios where there is no direct connection between the node experiencing the failure and the newly serving node. These scenarios could be, for example:

Scenario 1) Failure while in LTE or during a handover (HO) to 2G/3G, reconnection at 2G/3G;

Scenario 2) Failure during or after a HO from 2G/3G to LTE and reconnection back at 2G/3G;

Scenario 3) Failure while in 2G/3G or during a HO to LTE, reconnection at LTE; and Scenario 4) Failure during or after a HO from LTE to 2G/3G and reconnection back at LTE.

In all the scenarios above, it can be observed that a mobility failure may occur while the UE moves from one RAT to another. Thus, after the failure, the UE may camp on, or be served by, a RAT different from the source RAT. Also, after the failure, the UE may connect to a 2G/3G NodeB not supporting RLF Report signaling, i.e., the NodeB does not support parts of the MRO function. This implies that the failure information available at the UE will not be reported to the LTE network before the UE manages to connect to an eNodeB supporting RLF Reporting signaling. The eNodeB where the UE connects after the failure and where the failure information is eventually reported is likely to be geographically distant from the eNodeB where the failure occurred, and there will probably not be an X2 connection between the two eNodeBs, which prevents forwarding the failure information from one eNodeB to another. The IRAT MRO solution specifies that the RLF Report shall be forwarded from the eNodeB where it was retrieved to the eNodeB where the failure occurred via the X2AP:RLF Indication message.

The above description highlights how the RLF Report stored at the UE may, in several cases of IRAT mobility failure, be lost and never reported to the nodes that could make use of it.

In scenarios with LTE islands within extended areas of UMTS coverage, the current 3GPP solution would require extensive (and perhaps unrealistic) use of the X2 interface between LTE cells in different islands. For this to work, X2 would have to be configured between all eNodeBs at the edge of different coverage islands, which would require unacceptably high memory consumption and a waste of node resources.

Other solutions for this scenario have been proposed in R3-122081 where it is proposed to introduce a method for forwarding the RLF report container over the S1 interface to the core network (i.e., the Mobility Management Entity (MME)) for cases where X2 is not set up. In one solution, an extension of the Self Optimizing Network (SON) Configuration Transfer was proposed. Another solution relies on MME CONFIGURATION TRANSFER and eNB CONFIGURATION TRANSFER extended with a MRO Failure Event Reporting IE.

SUMMARY

All of the proposed solutions have different drawbacks. As noted above, simply discarding the RLF report when there is no X2 connection will degrade the performance of the IRAT MRO function. Another solution requires eNodeBs that serve cells at the edge of an LTE coverage island to establish an X2 interface with all other eNodeBs serving cells at the edges of other coverage islands in a broad geographical area. This solution is not practical and is a large waste of network resources. Two other solutions rely on transporting the RLF INDICATION over S1 by extending the SON Configuration Transfer or the MME/eNB CONFIGURATION TRANSFER, which is used to transport Radio Information Management (RIM) messages. However, the signaling required for these solutions is not supported in current 3GPP releases.

The present disclosure solves the RLF reporting problem by forwarding the RLF Reports in an Operations & Maintenance (OAM)-based implementation in order to cover the LTE islands within a UTRAN coverage scenario.

According to a first embodiment, a method of handling Radio Link Failure (RLF) Reports in a radio access network is provided. Different Radio Access Technologies (RATs) are utilized in different areas served by the radio access network, and a User Equipment (UE) is configured to generate and store an RLF Report when the UE experiences a radio link failure at a first access node that utilizes a first RAT and the UE reconnects to a second access node that utilizes a second RAT. The method is performed in a third access node, which utilizes the first RAT. The method includes receiving at the third access node, the RLF Report from the UE when the UE subsequently connects to the third access node; determining that the third access node does not have a direct connection to the first access node for forwarding the RLF Report to the first access node; determining that receiving the RLF Report has caused a threshold value to be exceeded; generating an event log containing failure information for the first access node; and making the event log available to the network.

A further embodiment provides a third access node configured to handle RLF Reports in a radio access network, wherein different RATs are utilized in different areas served by the radio access network, and a UE is configured to generate and store an RLF Report when the UE experiences a radio link failure in a first access node that utilizes a first RAT and the UE reconnects to a second access node that utilizes a second RAT. The third access node utilizes the first RAT, and includes a radio interface that receives the RLF Report from the UE when the UE subsequently connects to the third access node; and a processor connected to a non-transitory memory that stores computer program instructions. When the processor executes the computer program instructions, the third access node is caused to determine that the third access node does not have a direct connection to the first access node; determine that receiving the RLF Report has caused a threshold value to be exceeded; generate an event log containing failure information for the first access node; and make the event log available to the network.

A further embodiment provides a network management node configured to handle RLF Reports in a radio access network, wherein different RATs are utilized in different areas served by the radio access network, and a UE is configured to generate and store an RLF Report when the UE experiences a radio link failure in a first access node that utilizes a first RAT and the UE reconnects to a second access node that utilizes a second RAT. When the UE subsequently connects to a third access node that utilizes the first RAT, the UE sends the RLF Report to the third access node. The network management node includes communication interfaces with the first access node and the third access node; and a processor connected to a non-transitory memory that stores computer program instructions. When the processor executes the computer program instructions, the network management node is caused to analyze statistics and events to determine that performance of the first access node suffers from a lack of RLF Reports indicating radio link failures in the first access node; determine that RLF Reports indicating radio link failures in the first access node are being discarded by the third access node; and take corrective action to provide radio link failure information to the first access node.

The disclosed solution handles RLF reports that would otherwise be discarded by radio nodes that do not have logical connections with the radio nodes where the failure occurred. The solution may significantly improve the MRO performance of radio nodes belonging to coverage islands whose RLF reports are received by radio nodes from different islands.

Additional logical links may be set up when circumstances dictate. However, since the setup of logical links may be an expensive operation in terms of resources for the reporting purpose, the network management node may first determine whether the setup is worthwhile.

Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

The present invention will now be described more fully hereinafter with reference to the accompanying drawings, in which preferred embodiments of the invention are shown. In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with GSM/UMTS/LTE standard terminology to illustrate the present invention, they are equally applicable to other kinds of mobile communication systems. Also, the term User Equipment (UE) used herein below may be any kind of mobile communication device like a mobile telephone, a Personal Digital Assistant (PDA), a network card, a laptop or any other mobile communication apparatus which is capable of communicating wirelessly (via an air interface) with a network.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a non-transitory memory coupled to the processor, wherein the memory is encoded with one or more programs that perform the method when executed by the processor.

Figure 1:
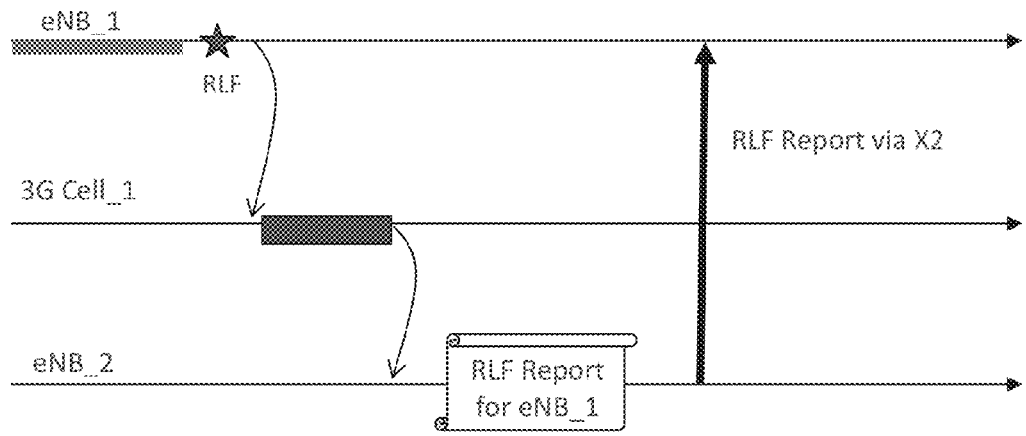
FIG. 1 is a sequence diagram illustrating an existing 3GPP solution as applied to a first scenario.
Figure 2:
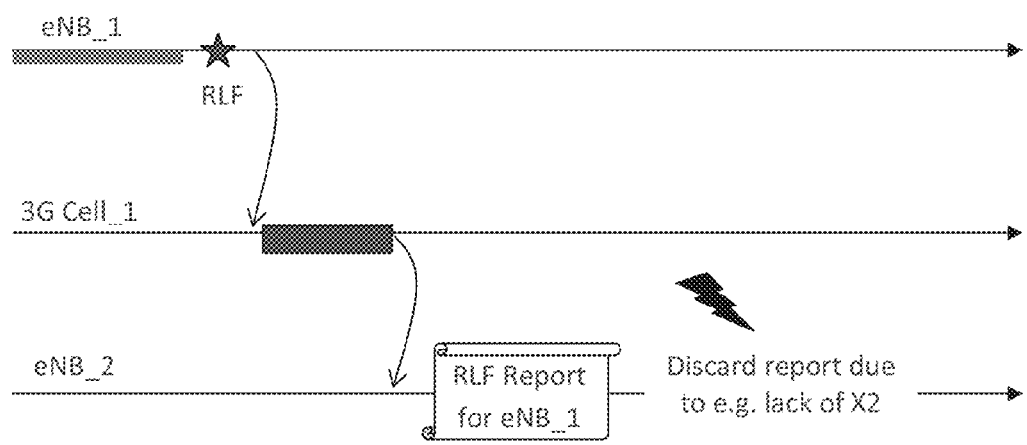
FIG. 2 is a sequence diagram illustrating an existing 3GPP solution as applied to a second scenario.
Figure 3:
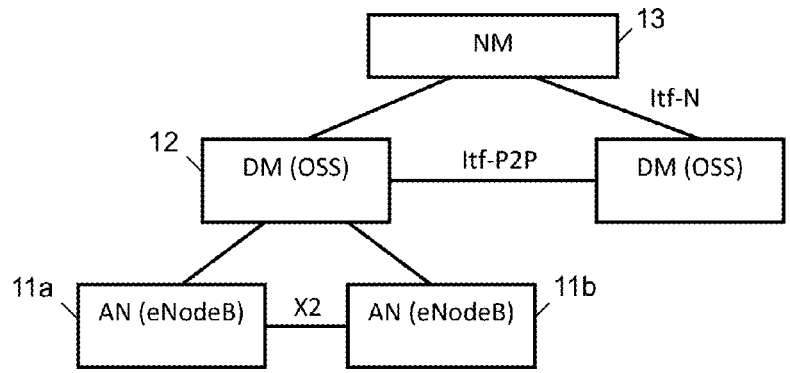
FIG. 3 is a simplified block diagram of an exemplary network management system suitable for implementing the solution of the present disclosure.

FIG. 3 is a simplified block diagram of an exemplary network management system suitable for implementing the solution of the present disclosure. In this embodiment, which illustrates LTE OAM network elements, one or more access nodes (ANs) 11a and 11b (e.g., eNodeBs) may be connected by an X2 interface and may be managed by an Operation and Support System (OSS) node such as a Domain Manager (DM) 12. The DM may further be managed by a Network Manager (NM) 13. The interface between two DMs is referred to as Itf-P2P. The management system may configure the ANs, as well as receive observations associated with features in the ANs. For example, the DM observes and configures the ANs, while the NM observes and configures the DM, as well as the ANs via the DM.

Figure 4:
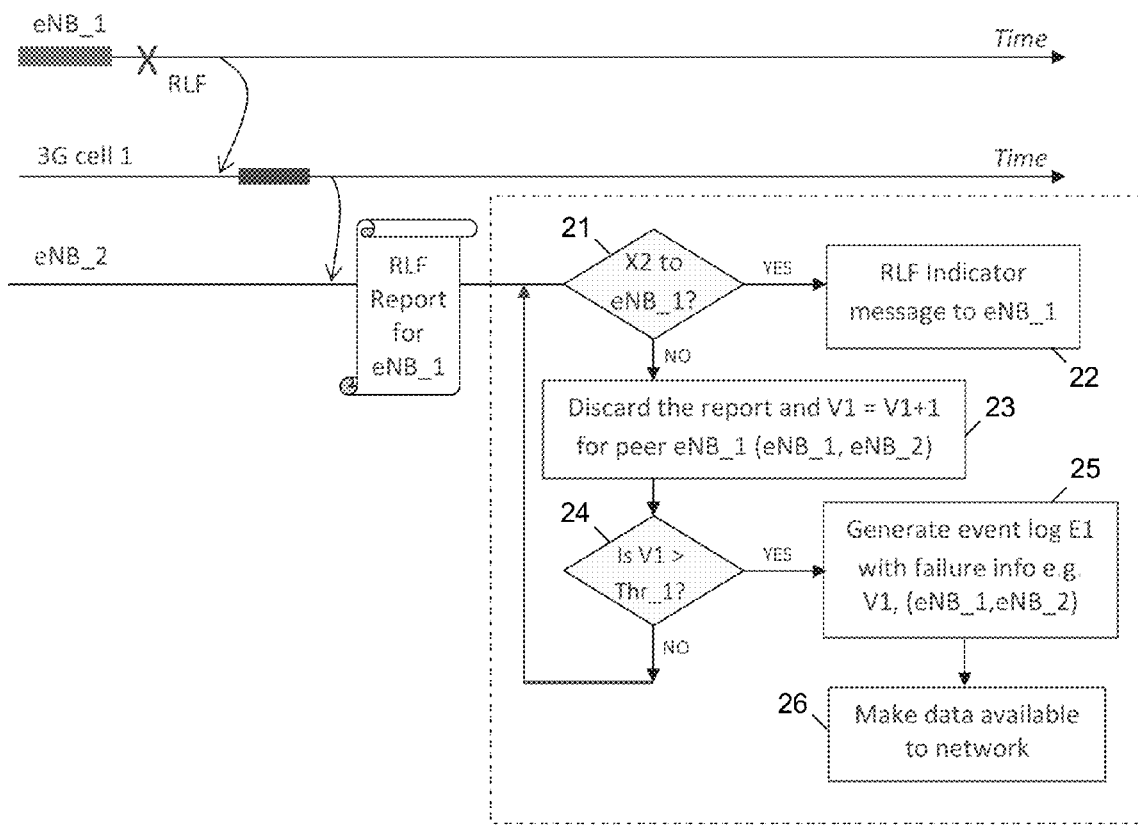
FIG. 4 is a sequence diagram illustrating an exemplary embodiment of the method of the present disclosure.

FIG. 4 is a sequence diagram illustrating an exemplary embodiment of the method of the present disclosure, as performed in a third access node (AN), in this case eNodeB_2. As illustrated, a UE operating in eNodeB_1 experiences an RLF and then reconnects for a period of time in 3G Cell_1. The UE stores link failure information for eNodeB_1 while operating outside of the LTE area (e.g., in 3G Cell_1). Subsequently, the UE is handed over to LTE again and connects to eNodeB_2, and sends the RLF Report to eNodeB_2 with the failure information for eNodeB_1.

For each received RLF Report associated with eNodeB_1 (which may support an MRO function), eNodeB_2 determines at step 21 whether there is a logical connection between eNodeB_2 and eNodeB_1 (for example an X2 interface). If there is a logical connection, the method moves to step 22 where eNodeB_2 sends the RLF Indicator message to eNodeB_1. If there is no logical connection, the method moves to step 23 where eNodeB_2 may discard the report and increment a counter (V1) for the number of received RLF reports associated with peer eNodeB_1 and store the value as a variable (V1=V1−1). At step 24, eNodeB_2 determines whether V1 is greater than or equal to a first threshold (Thr_1). Thr_1 may vary depending on each peer node, or alternatively may be the same for all peer nodes. If V1 is not greater than or equal to Thr_1, the method returns to step 21 and continues to receive RLF Reports. However, if V1 is greater than or equal to Thr_1, the method moves to step 25 where an event log E1 is generated with information about the discarded RLF Reports for peer node eNodeB_1. For example, information stored as part of the recorded event could include the time stamps associated with the discarded RLF Reports (providing information about how fast the threshold is achieved) and the peer node where the report should have been forwarded. At step 26, eNodeB_2 makes the E1 data available to the network, for example by sending the data to the DM 12, or allowing the DM to access the data in an internal memory of eNodeB_2.

The event log E1 may be stored in a ROP file placed, for example, at the Performance Management (PM) system of eNodeB_2. An operator may preconfigure eNodeB_2 with the criteria to trigger event E1 and/or with the values for Thr_1, or eNodeB_2 may be configured with such data by a centralized management node.

Alternatively, the variable V1 may represent a ratio of received RLF Reports within a defined time window (i.e., the rate at which RLF Reports are being received), and the threshold Thr_1 may represent a frequency limit above which the event E1 is triggered. Alternatively or in addition, eNodeB_2 (within a period Per_E1) may periodically report the variable V1 per peer in the event E1.

FIGS. 5-9 depict other exemplary embodiments of the present disclosure. In each of FIGS. 5-9, the UE is presumed to have experienced a radio link failure in a first access node (N1) 31 that utilizes a first RAT, and the UE reconnects to a second access node (N2) (not shown) that utilizes a second RAT. The UE generates and stores an RLF Report until the UE connects at a later time to a third access node (N3) 32 that again utilizes the first RAT. The UE then sends the RLF Report to the third access node. N1 and N3 do not initially have a logical connection between them, but a Network Management Node (NMN) 33 (for example the DM 12 or NM 13) has logical connections to both N1 and N3. N1 may implement a Mobility Robustness Optimization (MRO) module; N3 may implement a Report Handling Distributed (RHD) module; and the NMN may implement a Report Handling Centralized (RHC) module. In particular embodiments, N1 and N3 may be two eNodeBs without an X2 logical connection.

Figure 5:
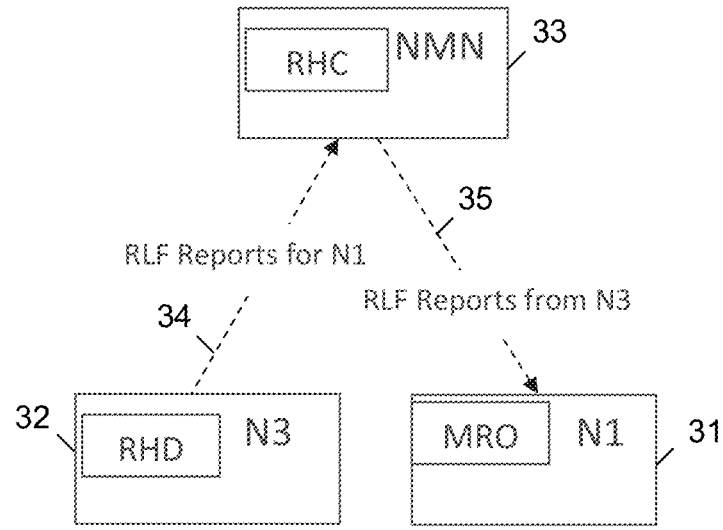
FIG. 5 depicts another exemplary embodiment of the present disclosure.

Referring to FIG. 5, the RHD module of N3 performs the method as performed by eNodeB_2 in FIG. 4, and makes the E1 RLF Reports for N1 available to the NMN at step 34. At step 35, the NMN then forwards the RLF Reports to N1.

Alternatively, the NMN may receive indications from radio nodes such as N3 concerning received failure information that cannot be forwarded to the appropriate node, and may increase a variable similar to V1, for which thresholds similar to Thr_1 have been defined. This logical connection may be upstream (receive information from the radio nodes) or downstream (send information to the radio nodes). In a particular implementation, the logical interface may be an Itf-N interface where the NMN 33 is the DM 12 or the NM 13, and the radio nodes N1 and N3 are eNodeBs. In this case, current standardization defines only an upstream interface. Enhancements to the currently standardized Itf-N interface would enable the downstream communication. Otherwise a proprietary solution may be implemented.

Figure 6:
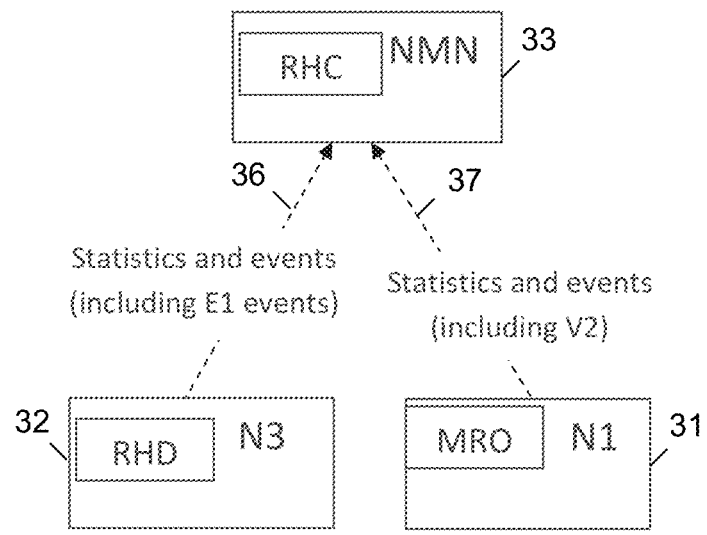
FIG. 6 depicts another exemplary embodiment of the present disclosure.

FIG. 6 depicts another exemplary embodiment of the present disclosure, as performed by the RHC module in the NMN 33. In the context of this embodiment, N1 31 performs a method which increments a variable V2, incremented each time a RLF Report is processed. The variable is reinitialized when the MRO module applies changes to the mobility configuration in the node. The variable V2 may be stored (e.g., as a distribution) in a file placed, for example, at the Performance Management (PM) system of N1 or streamed as an event E2 to the NMN, where event E2 contains all performance data related to the MRO functionality, including the processed RLF Report count, time stamps for such processed RLF Reports, and peer nodes from which the RLF Report is received.

The initial processing by the RHC module in the NMN is to determine whether the number of processed RLF Reports stored in V2 is high enough to provide the MRO process in N1 with good insights about the failures and enable adoption of robust corrective measures. This may be confirmed by determining that the MRO performance of N1 is not as good as the MRO performance of other nodes where the number of processed RLF Reports is much larger. For example, the MRO performance can be measured by monitoring the rate at which RLF (or failures in general) occur when compared to the number of MRO adjustments. The fact that the NMN is a central node helps it perform this MRO performance comparison, and thereby determine that N1 suffers from the fact that a large number of RLF reports are being discarded by N3, which does not have a logical connection with N1. In a similar way, the RHC module in the NMN may check the statistics and data received from N3 and infer the number or frequency of RLF Reports that were discarded instead of being forwarded to N1.

At step 36, the NMN 33 receives and processes events and performance statistics (counters) related to MRO from N3 32 (events E1, counters, RLF Reports). At step 37, the NMN receives and processes events and performance statistics related to MRO from N1 31 (session drops, A2 and B2 events/reports, V2, Event E2, etc.). The events and statistics from N1 indicate lack of RLF Reports to perform robust changes derived from the MRO function. Such indication may be determined from the overall number of RLF Reports or the number of RLF Reports concerning the N1-N3 node peer. The NMN then takes corrective action to make these reports available at N1.

Figure 7:
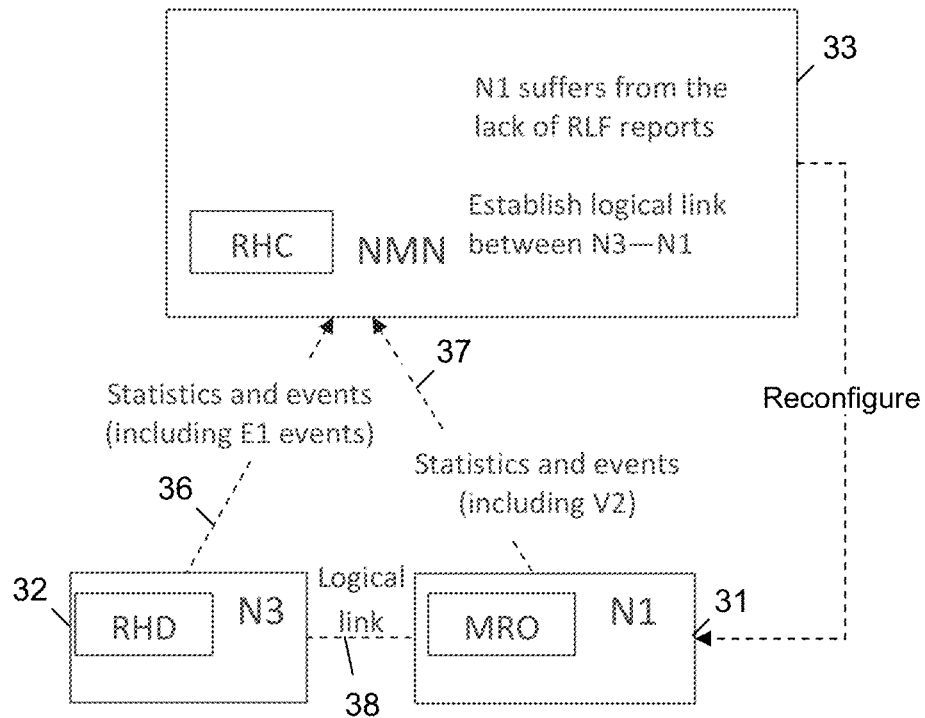
FIG. 7 depicts another exemplary embodiment of the present disclosure.

FIG. 7 depicts another exemplary embodiment of the present disclosure showing alternative examples of corrective action the NMN may take. This embodiment implements an MRO Centralized (MROC) module, which may be located in the NMN 33. The MROC module performs a method that decides to process such statistics and data from N3 and/or N1 (e.g., RLF Reports) and determines the best corrective action needed to resolve the failures experienced. As an example, the NMN may adjust the MRO module in the radio nodes N3 and/or N1 since the NMN may have access to statistics about discarded RLF reports or the discarded RLF reports themselves which may be triggered via performance traces. Alternatively, the NMN may apply corrective actions by reconfiguring the mobility parameters of N3 and/or N1.

In one example, the NMN commands establishment of a direct logical link 38 (for example an X2 interface) between N3 and N1 for N3 to send future RLF Reports to N1. Alternatively, the NMN may command N3 to forward RLF Reports to the NMN. The NMN may then interpret the RLF Reports and, by supporting MRO functionalities, may determine the appropriate changes needed to be applied to mobility parameters of N1 in order to mitigate the failure cases encountered. The NMN may consequently configure N1 with the determined changes.

Alternatively, N3 may report to the NMN, the event of receiving the RLF Report and not being able to forward it to N1. The NMN may store the variable V1 and may be configured with a value for Thr_1. Upon crossing of the established thresholds, N3 and/or the NMN may decide to trigger the direct interface connection 38 between N1 and N3.

This may be an automatic triggering by the NMN 33 if the NMN has the permission to do it (for example, when the NMN is the Domain Manager or the Network Manager in LTE). In a particular implementation, the NMN is the Domain Manager or the Network Manager and it triggers an X2 link between eNodeBs N1 and N3. The NMN may also have access to memory consumption information in both eNodeBs, which may inform the NMN how expensive the setup of an X2 link between these eNodeBs will be. The DM or NM may be configured to confirm the eNodeBs have sufficient available memory capacity to handle additional memory requirements of the X2 interface prior to configuring the eNodeBs to establish the X2 interface. Current standardized interfaces connecting N1, N3, and the NMN may need to be enhanced to allow reporting of information from N3 to N1.

Figure 8:
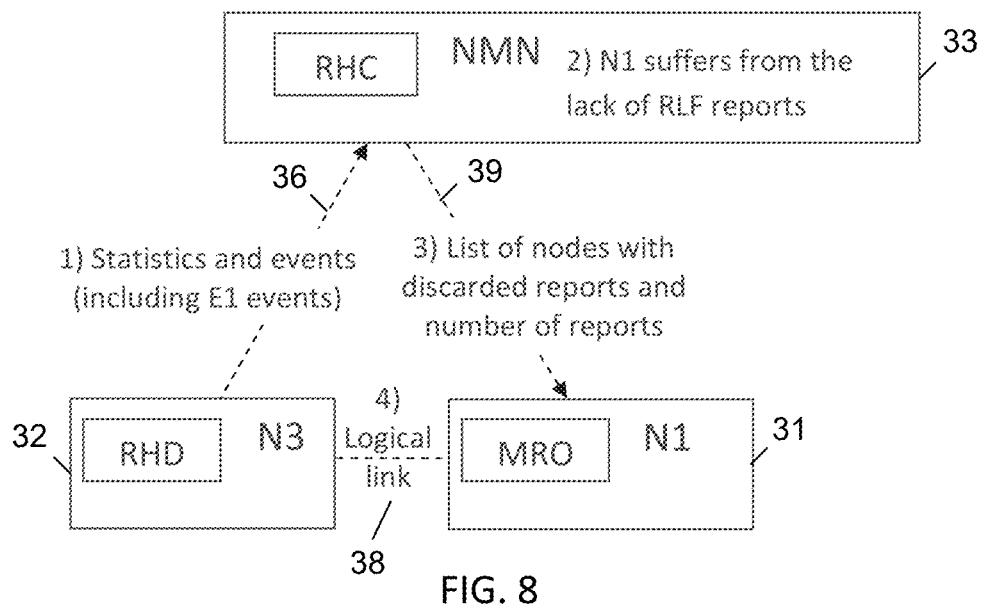
FIG. 8 depicts another exemplary embodiment of the present disclosure.

FIG. 8 depicts another exemplary embodiment of the present disclosure. Once again, at step 36, the NMN 33 receives and processes events and performance statistics related to MRO from N3 32 (events E1, counters, RLF Reports). From this information, the NMN determines N1 31 suffers from the lack of RLF Reports. At step 39, the NMN sends a list of nodes of type N3 with discarded RLF Reports and the number of such reports to N1. N1 may then use its own logic to decide to establish a direct logical link 38 with N3. The decision may consider the cost of setting up this logical link versus the improved MRO performance.

Thus, in the examples of FIGS. 7 and 8, since N3 has no logical direct connection (for example the X2 interface) with N1, N3 discards the failure report. The number of discarded reports is counted by N3 and/or by the NMN (provided that statistics are sent from N3 to the NMN) on a per peer node basis. Such counting may be performed by the RHD module in N3. If the number of discarded reports per peer node grows beyond a certain threshold or at a rate faster than a preconfigured limit, N3 and/or the NMN may decide to establish a direct logical link with N1.

Figure 9:
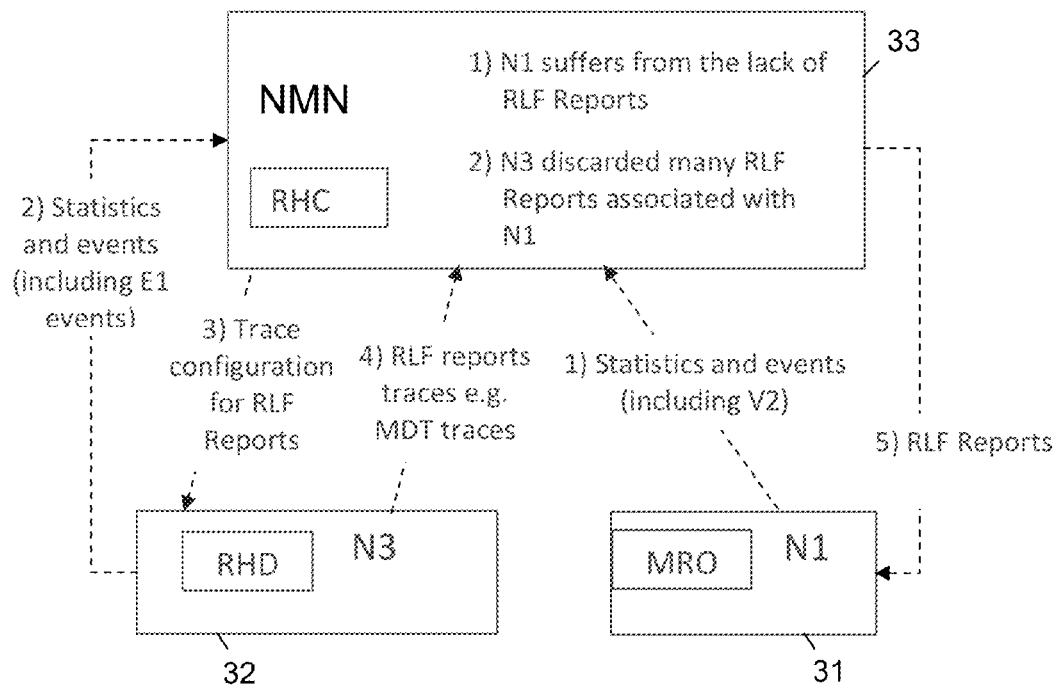
FIG. 9 depicts another exemplary embodiment of the present disclosure.

FIG. 9 depicts another exemplary embodiment of the present disclosure. First, statistics and events (including V2) received from N1 31 enable the NMN 33 to detect that N1 suffers from the lack of RLF reports. Second, events and performance statistics received from N3 32 (events E1, counters, RLF Reports) enable the NMN to detect that a large number of RLF Reports for N1 have been discarded in N3. Third, the NMN configures N3 to trigger performance traces that encapsulate the RLF Reports. Fourth, N3 sends the performance traces to the NMN. Fifth, the NMN may then forward the RLF Reports to N1 for use by the MRO function at N1. The interfaces between N1 and N3, and N2 and N3, may be an itf-N interface.

Figure 10:
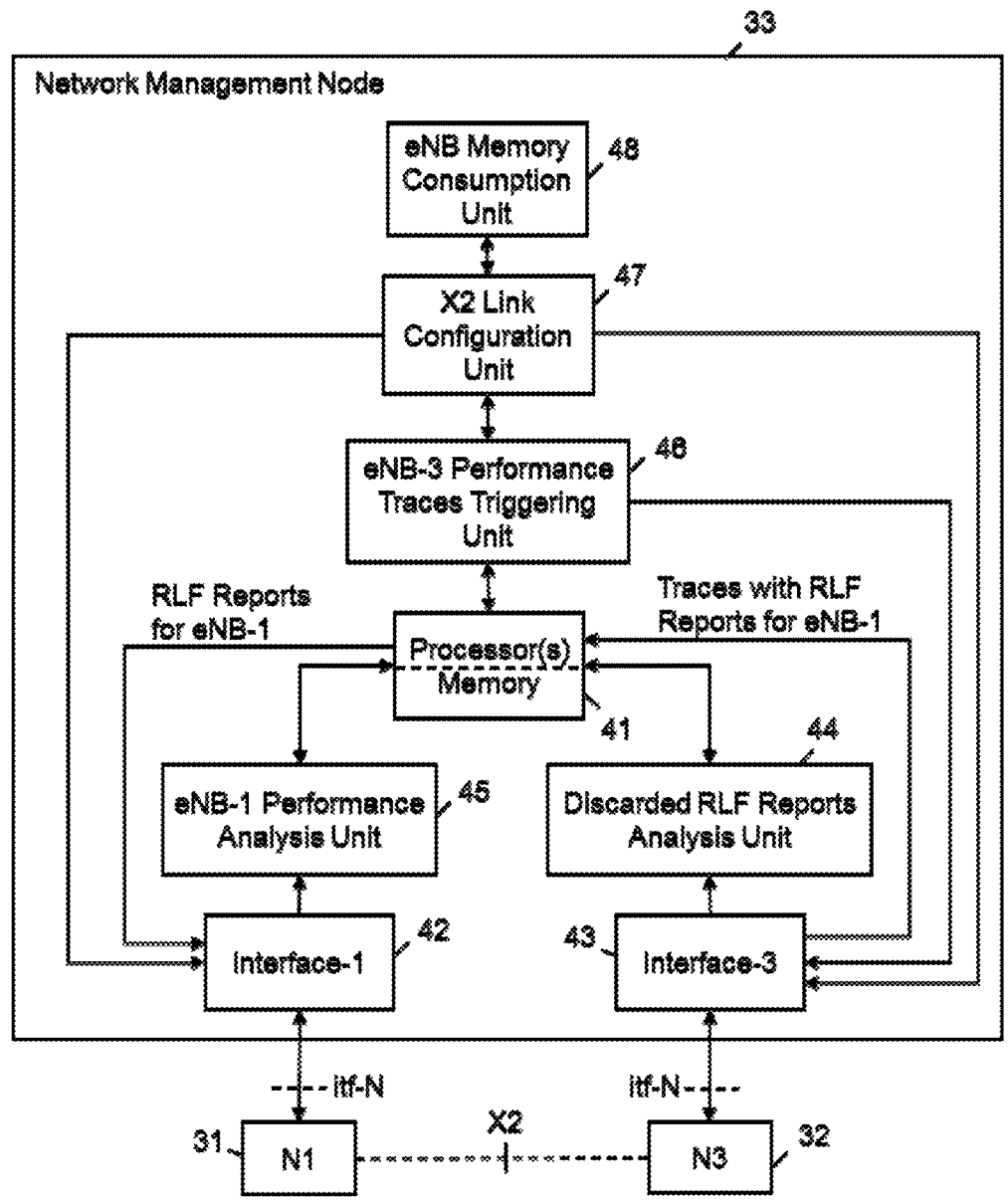
FIG. 10 is a simplified block diagram of a network management node in an exemplary embodiment of the present disclosure.

FIG. 10 is a simplified block diagram of the network management node (NMN) 33 in an exemplary embodiment of the present disclosure. The NMN may be controlled, for example, by a processor 41 coupled to a memory device that stores computer program instructions. The processor may control the NMN when executing the computer program instructions. N1 31 may connect to the NMN through Interface-1 42, and N3 32 may connect to the NMN through Interface-2 43. Initially, N1 and N3 do not have a logical link between them; thus the X2 interface is shown with a dashed line.

Events and performance statistics (events E1, counters, RLF Reports) reported by N3 may be analyzed in a discarded RLF Reports analysis unit 44. Likewise, an eNodeB-1 performance analysis unit 45 may analyze statistics and events (session drops, A2 and B2 events/reports, V2, Event E2, etc.) received from N1. The processor 41 receives inputs from both units to determine whether corrective action is needed, and if so, what action should be taken.

When the processor 41 determines that the NMN 33 should trigger performance traces from N3, an eNodeB-3 performance traces triggering unit 46 sends an appropriate instruction through Interface-3 44 to N3. N3 then sends performance traces to the NMN that encapsulate the RLF Reports for N1.

When the processor 41 determines that an X2 connection should be configured between N1 and N3, an X2 configuration unit 47 may instruct either N1 or N3 to configure the link. The X2 configuration unit may obtain information about the available memory capacities of N1 and N3 from an eNodeB memory consumption unit 48 so that the impact of the memory requirements of the X2 connection can be taken into account when deciding whether the X2 connection should be configured.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of handling Radio Link Failure (RLF) Reports in a radio access network, wherein different Radio Access Technologies (RATs) are utilized in different areas served by the radio access network, and a User Equipment (UE) is configured to generate and store an RLF Report when the UE experiences a radio link failure at a first access node that utilizes a first RAT and the UE reconnects to a second access node that utilizes a second RAT, wherein the method is performed in a third access node, which utilizes the first RAT, the method comprising:

receiving at the third access node, the RLF Report from the UE when the UE subsequently connects to the third access node;

determining that the third access node does not have a direct connection to the first access node for forwarding the RLF Report to the first access node;

determining that receiving the RLF Report has caused a threshold value to be exceeded;

generating an event log containing RLF reports for the first access node; and making the event log available to the network, wherein making the event log available includes sending performance traces to a network management node, wherein the performance traces encapsulate the RLF reports indicating radio link failures in the first access node, wherein the network management node forwards to the first access node, the RLF reports received in the performance traces from the third access node.

2. The method according to claim 1, further comprising incrementing a counter whenever an RLF Report is received indicating a radio link failure in the first access node, wherein the step of determining that receiving the RLF Report has caused the threshold value to be exceeded includes:

determining that receiving the RLF Report from the UE has caused the counter to exceed a threshold number of RLF Reports that triggers generation of the event log.

3. The method according to claim 1, further comprising determining a rate at which RLF Reports are being received indicating radio link failures in the first access node, wherein the step of determining that receiving the RLF Report has caused the threshold value to be exceeded includes:

determining that receiving the RLF Report from the UE has caused the rate of receiving RLF Reports for the first access node to exceed a threshold rate that triggers generation of the event log.

4. The method according to claim 1, further comprising:

incrementing a counter whenever an RLF Report is received indicating a radio link failure in the first access node; and determining a rate at which RLF Reports are being received indicating radio link failures in the first access node;

wherein the step of determining that receiving the RLF Report has caused the threshold value to be exceeded includes determining whether receiving the RLF Report from the UE has caused the counter to exceed a threshold number of RLF Reports that triggers generation of the event log;

upon determining that receiving the RLF Report from the UE has not caused the counter to exceed the threshold number of RLF Reports, determining whether receiving the RLF Report from the UE has caused the rate of receiving RLF Reports indicating radio link failures in the first access node to exceed a threshold rate; and upon determining that receiving the RLF Report from the UE has caused the rate of receiving RLF Reports indicating radio link failures in the first access node to exceed the threshold rate, performing the generating and making steps.

5. The method according to claim 1, further comprising, in response to the threshold value being exceeded:

establishing a direct connection between the third access node and the first access node; and forwarding to the first access node, subsequent RLF Reports received by the third access node that indicate radio link failures in the first access node.

6. A third access node configured to handle Radio Link Failure (RLF) Reports in a radio access network, wherein different Radio Access Technologies (RATs) are utilized in different areas served by the radio access network, and a User Equipment (UE) is configured to generate and store an RLF Report when the UE experiences a radio link failure in a first access node that utilizes a first RAT and the UE reconnects to a second access node that utilizes a second RAT, wherein the third access node utilizes the first RAT, the third access node comprising:

a radio interface that receives the RLF Report from the UE when the UE subsequently connects to the third access node; and a processor connected to a non-transitory memory that stores computer program instructions, wherein when the processor executes the computer program instructions, the third access node is caused to:

determine that the third access node does not have a direct connection to the first access node;

determine that receiving the RLF Report has caused a threshold value to be exceeded;

generate an event log containing failure information for the first access node; and make the event log available to the network, wherein the third access node is configured to make the event log available by sending performance traces to a network management node, wherein the performance traces encapsulate the RLF reports indicating radio link failures in the first access node, wherein the network management node forwards to the first access node, the RLF reports received in the performance traces from the third access node.

7. The third access node according to claim 6, further configured to increment a counter whenever an RLF Report is received indicating a radio link failure in the first access node, and to determine that receiving the RLF Report from the UE has caused the counter to exceed a threshold number of RLF Reports that triggers generation of the event log.

8. The third access node according to claim 6, further configured to determine a rate at which RLF Reports are being received for the first access node, and to determine that receiving the RLF Report from the UE has caused the rate of receiving RLF Reports indicating radio link failures in the first access node to exceed a threshold rate that triggers generation of the event log.

9. The third access node according to claim 6, further configured to:
increment a counter whenever an RLF Report is received indicating a radio link failure in the first access node;
determine a rate at which RLF Reports are being received indicating radio link failures in the first access node;
determine whether receiving the RLF Report from the UE has caused the counter to exceed a threshold number of RLF Reports that triggers generation of the event log;
when receiving the RLF Report from the UE has not caused the counter to exceed the threshold number of RLF Reports, determine whether receiving the RLF Report from the UE has caused the rate of receiving RLF Reports indicating radio link failures in the first access node to exceed a threshold rate; and
when receiving the RLF Report from the UE has caused the rate of receiving RLF Reports indicating a radio link failure in the first access node to exceed the threshold rate, generate the event log and make the event log available to the network.

10. The third access node according to claim 6, wherein in response to the threshold value being exceeded, the third access node is further configured to:
establish a direct connection between the third access node and the first access node; and
forward to the first access node, subsequent RLF Reports received by the third access node that indicate a radio link failure in the first access node.

11. A network management node configured to handle Radio Link Failure (RLF) Reports in a radio access network, wherein different Radio Access Technologies (RATs) are utilized in different areas served by the radio access network, and a User Equipment (UE) is configured to generate and store an RLF Report when the UE experiences a radio link failure in a first access node that utilizes a first RAT and the UE reconnects to a second access node that utilizes a second RAT, wherein when the UE subsequently connects to a third access node that utilizes the first RAT, the UE sends the RLF Report to the third access node, the network management node comprising:
communication interfaces with the first access node and the third access node;
a processor connected to a non-transitory memory that stores computer program instructions, wherein when the processor executes the computer program instructions, the network management node is caused to:
analyze statistics and events to determine that performance of the first access node suffers from a lack of RLF Reports indicating radio link failures in the first access node;
determine that RLF Reports indicating radio link failures in the first access node are being discarded by the third access node; and
take corrective action to provide radio link failure information to the first access node, wherein the network management node is configured to take corrective action by:
configuring the third access node to trigger performance traces that encapsulate the RLF reports indicating radio link failures in the first access node; and
forwarding to the first access node, the RLF reports received in the performance traces from the third access node.

12. The network management node according to claim 11, wherein the network management node is also configured to take corrective action by:
configuring the first or third access node to establish a direct connection between the first access node and the third access node for passing future RLF Reports.

13. The network management node according to claim 12, wherein:
the first and third access nodes are eNodeBs in a Long Term Evolution (LTE) radio access network;
the network management node is a Domain Manager (DM) or Network Manager (NM);
an itf-N interface provides the communication interfaces with the first eNodeB and the third eNodeB; and
the direction connection between the first eNodeB and the third eNodeB is an X2 interface.

14. The network management node according to claim 13, wherein the network management node has access to memory consumption information in both eNodeBs, and the network management node is configured to confirm the eNodeBs have sufficient available memory capacity to handle additional memory requirements of the X2 interface prior to configuring the eNodeBs to establish the X2 interface.

* * * * *